United States Patent [19]

Greenwald, Sr.

[11] Patent Number: 5,413,703
[45] Date of Patent: May 9, 1995

[54] METHOD AND APPARATUS FOR DEWATERING

[76] Inventor: Edward H. Greenwald, Sr., 52 Nancy La., McMurray, Pa. 15137

[21] Appl. No.: 95,862

[22] Filed: Jul. 22, 1993

Related U.S. Application Data

[60] Division of Ser. No. 735,386, Jul. 24, 1991, Pat. No. 5,236,596, which is a continuation-in-part of Ser. No. 112,669, Oct. 22, 1987, abandoned.

[51] Int. Cl.6 .................. B03D 3/00; B01D 21/00; B01D 21/28; C10L 9/10
[52] U.S. Cl. .................. 210/205; 210/206; 210/219; 210/696; 210/697; 210/406; 209/10; 209/17; 209/164; 209/166; 44/626
[58] Field of Search ............... 210/696, 205, 206, 219, 210/406, 697; 209/10, 17, 164, 166; 44/626

[56] References Cited

U.S. PATENT DOCUMENTS

| 3,361,259 | 1/1968 | Von der Gathen . |
| 4,284,413 | 8/1981 | Capes . |
| 4,437,861 | 3/1984 | Ishizuka . |
| 4,437,982 | 3/1984 | Wasson . |
| 4,477,353 | 10/1984 | Messer . |
| 4,537,599 | 8/1985 | Greenwald . |
| 4,775,468 | 10/1988 | Peterson . |
| 5,089,142 | 2/1992 | Turunc . |
| 5,236,596 | 8/1993 | Greenwald . |

FOREIGN PATENT DOCUMENTS 2121433 12/1983 United Kingdom .

*Primary Examiner*—Thomas M. Lithgow
*Attorney, Agent, or Firm*—Clifford A. Poff

[57] ABSTRACT

A method and apparatus for dewatering an aqueous coal slurry includes imparting high shear forces to the aqueous coal slurry in the presence of a peptizing agent to render coal particles hydrophobic by stripping clay from the coal particles and peptizing the clay in the aqueous medium of the slurry. The slurry is separating to recover coal particles and the aqueous medium is draining medium from the hydrophobic surface of the coal particles.

8 Claims, 7 Drawing Sheets

METHOD AND APPARATUS FOR DEWATERING

CROSS-REFERENCE TO RELATED PATENT APPLICATION

This is a divisional of application Ser. No. 07/735,386 filed on Jul. 24, 1991, now U.S. Pat. No. 5,236,596 which is a continuation-in-part of patent application Ser. No. 07/112,669, filed Oct. 22, 1987, now abandoned.

BACKGROUND OF THE INVENTION

1. Field of the Invention

This invention relates to a method and apparatus for dewatering ultra-fine coal and more particularly to dewatering an aqueous coal slurry after separating peptized clay from coal particles in a slurry thereof.

2. Description of the Prior Art

In U.S. Pat. No. 4,537,599 there is disclosed a process for removing sulfur and ash, particularly clay and pyrite from the surface of coal particles. A peptized slurry of coal particles is treated to separate clay and pyrite from the coal and weaken chemically bonded contaminants on the coal surface. The clay and pyrite particles are dispersed as a colloid in an aqueous medium of the slurry. To maintain the colloidal suspension, the pH of the slurry is adjusted by the addition of a normalizer. The slurry is then beneficiated in a centrifuge and in froth-flotation cells to recover coal particles greater than two microns. Thereafter, an aqueous coal slurry is again formed and the pH is adjusted to maintain contaminants as colloids in the aqueous medium of the slurry during treatment with sonic energy and ozone. Thereafter, the aqueous coal slurry with the aqueous medium containing colloidal contaminants is classified to again separate coal particles from contaminants.

The cleaned coal product recovered from this process can be used for diverse purposes, one use as disclosed in U.S. Pat. No. 4,662,894, is as a feed stock for the preparation of a coal water mixture. The cleaned coal product is first separated so that coal particles of different size classifications form two or more coal feed streams which are delivered to separate surge vessels in a liquid medium. The feed stream comprised of coal particles having the smallest size are again classified to discard a minus two micron fraction which is comprised mainly of contaminants, particularly clay, and thereafter selected quantities of each of the coal feed streams are mixed together in the presence of a dispersing agent to form a coal-water mixture.

It is time consuming and costly, particularly in terms of energy requirements, to reduce the water content of a mass of coal particles, particularly in instances where the coal particles after cleaning to remove clay and pyrite are to be used in the form of a feed stock having a low moisture content for any of diverse purposes such as for a coal-water mix. The moisture content of the cleaned coal after classification in the centrifuge according to the process of U.S. Pat. No. 4,537,599, is usually about 32% to 36% by weight and no significant moisture reduction occurs even after several days residence in storage. When an aqueous coal water slurry is dewatered in a conventional belt press, it was found that the moisture content was about 36%.

SUMMARY OF THE INVENTION

It is an object of the present invention to provide a method and apparatus for economically reducing the water content of an aqueous coal slurry to a grater extent than heretofore possible without using sensible heat.

It is a further object of the present invention to provide a method and apparatus for economically dewatering a mass of ultra fine coal particles by treating the coal particles as part of an aqueous slurry wherein the coal particles are rendered hydrophobic and clay contaminants stripped from the surface of the coal particles are treated so as to flow freely from the mass of coal particles in the aqueous medium.

It is a further object of the present invention to provide a method and apparatus for dewatering an aqueous coal slurry wherein the slurry is subjected to high shear forces in the presence of a peptizing agent so that hydrophilic clay particles stripped from the coal particles are rendered readily separable with the aqueous medium from the coal particles by treatment of the aqueous coal slurry with vibratory energy which can take the form of an air stream to drive aqueous medium from the coal particles.

More particularly, according to the present invention, there is provided a method of dewatering an aqueous coal slurry wherein the method includes imparting high shear forces to the aqueous coal slurry in the presence of a peptizing agent to render the coal particles dilatant and hydrophobic by the stripping of clay contaminants from the coal particles, the stripped clay being peptized in the aqueous medium of the slurry, separating the aqueous medium including the peptized clay from the coal particles, and vibrating the coal particles at a frequency sufficient to drive aqueous medium from the mass of the coal particles.

In the apparatus of the present invention there is provided a vessel wherein coal particles in an aqueous medium are subject to high sheer forces as by mixing, in the presence of a peptizing agent which is added to the aqueous medium in the vessel, and means for imparting vibratory energy to the aqueous coal slurry recovering from the vessel while allowing an aqueous medium to drain from the coal particles.

BRIEF DESCRIPTION OF THE DRAWINGS

These features and advantages of the present invention as well as others will be more fully understood when the following description is read in light of the accompanying drawings in which.

DESCRIPTION OF THE PREFERRED EMBODIMENT

As is known, for example, from an article entitled *Fine Coal Preparation—An Overview* by: Joseph L. Walker, published Fine coal producers face a special problem in terms of transporters, users and producers of the product because of the coal particle size, ash content and moisture. The problem is particularly acute with ultra-fine coal particles because as the dimensions of the coal particles decrease, the number of coal particles increase as the cube of the reduction ratio and because as the dimensions of the particle decreases the mass of the particle decreases inversely as the cube of the particle, and finally as the dimensions of the particle decrease the surface area of the particle decreases as the square of the reduction ratio. In short there is with a decreasing particle size an exponential increase in the number of particles. Moisture retention particularly by clay contaminated ultra fine particles is prohitivally high whereby a coal mass made up predominantly of coal particle fines less than 40 microns is not a useful coal supply. This is because of the low BTU value due to the high ash and high moisture content. The present invention seeks to provide a treatment for such ultra fine coal particles rendering them not only low in ash content but unusually low in moisture content.

Figure 1:
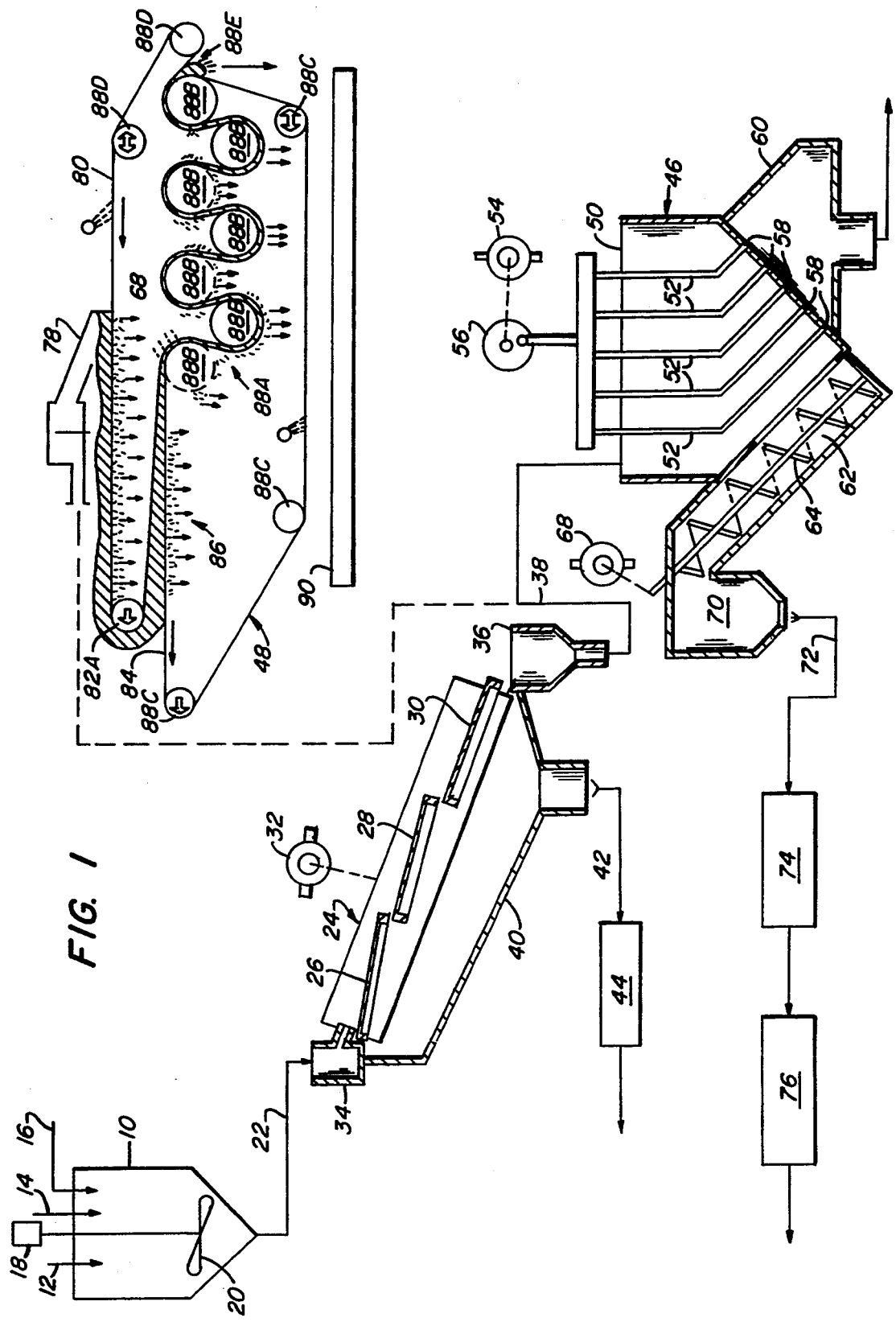
FIG. 1 is a schematic illustration of one arrangement of apparatus of the present invention which is also suitable to carry out of the method thereof.

Referring now to FIG. 1, there is illustrated a mixing vessel 10 into which there is added a coal feed stock, which is indicated by reference numeral 12, the feed stock may be freshly mined coal or coal salvage from silt ponds or other suitable sources. The feed stock can be an aqueous slurry, as for example, the underflow from a static thickener or other thickening device common to the practice of coal processing. Untreated ultrafine coal may comprise the feed stock for the process and apparatus of the present invention. Such coal generally has constituent components of: coal of varying purity; high ash impure coal or bone; clay and clay shales; pyrite/marcasite; and various other high ash carbonaczous and non-carbonaczous rocks and minerals. If desired, the feed stock can be cleaned coal particles derived from other coal cleaning process after treatment for removal of any hydrocarbon containment from the surfaces of coal particles that are to be peptized. Preferably the feed stock is made up of coal particles typically 100 mesh or less but can be 4 mesh or less, Tyler series. The vessel 10 also receives water, if required, which is introduced by line 14 to form an aqueous slurry in the vessel to which there is also added a peptizing agent by way of line 16. Preferably the aqueous coal slurry contains 25% to 35% solids by dry weight. The peptizing agent is added as one step in the forming of the aqueous coal slurry. Any one of a number of substances can form the peptizing agent, an example of one peptizing agent is sodium hexametaphosphate which is effective in a pH range of about 6.8 to about 8.0.

In the forming of the peptized coal slurry, a motor 18 is energized to rotate a mixer blade 20 that is submerged in the tank. The mixer is operated for a period of time, usually at least 5 minutes under operating conditions that impart high shear forces to the coal water slurry. During the high shear mixing/peptizing period, a high degree of aeration or air entrainment takes place including solubilizing of air in the water of the slurry. Thus there is solubized air in the water on the surface of the coal particles. The application of high shear forces breaks the adhesion and ionic bonds which bond clay particles. The mixing of the slurry in the peptizing vessel, peptizes the clay particles and deagglomeration occurs which renders the individual coal impurities, other than clay, and clay particles into a state of discreteness. The individual clay particles fall within a typical size range of between 0.68 to 2.0 micrometers and interact with a peptizing agent to effect an ionic exchange thereby imparting to the clay particles a strong negative electrokinetic charge. The peptized clay particles become discrete and become suspended as a colloid in the associated water of the slurry. Under these conditions, the individual coal particles attain a state of discreetness from clay and other coal impurities released from the face surfaces of the coal particles. Once free of adhered clay, the coal particles are rendered hydrophobic. In the event the selected peptizing agent requires a pH adjustment to the aqueous slurry, then according to the demands of the particular peptizing agent a suitable neutralizing agent is introduced into the vessel to bring about the required pH adjustment.

The treated aqueous slurry is then discharged from the vessel 10 by line 22 to a wet screening apparatus 24 having three tandemly arranged vibrating screens 26, 28 and 30 where the aqueous phase along with peptized clay particles and other undersized contaminants drain from the coal particles which remain on the screens. After the initial drainage of a predominant liquid part of the aqueous phase, the vibrating screen, imparts energy to the coal particles which are now in a state of dilatancy. The energy causes an expulsion of surface moisture from the coal particles along with clay particles associated therewith. It can be expected that the moisture content of the overflow product will be reduced from an initial 70–75% moisture by weight down to 30–31% percent moisture content when discharged from the vibrating screens. The reduced moisture content is significantly less than the usually 40% which is obtained without peptization and attendant clay desliming.

The wet screening apparatus illustrated in FIG. 1 is of the type well known in the art and made by Derrick Manufacturing Company of Buffalo, N.Y. The three screen panels 26, 28 and 30 are mounted on a frame which is excited by a high speed vibrating motor 32. The screen panels preferably have screens having a 400 mesh (37 um) size. Typically, the screen panels vibrate at 3600 cycles per minute which is a high frequency vibration having a low amplitude to rapidly expel aqueous liquid including clay, which may still be present, from the coal particles. The aqueous coal slurry is distributed across the width of the first screen panel 27 by a head box 34. The screen panels are inclined to the horizontal in a manner such that the screening surfaces extend downwardly to a terminal end where the top screen product passes to an underlying collector 36 which directs the top screen product to discharge line 38. The aqueous liquid medium, peptized clay, other undersized contaminants and undersized coal particles pass through the screens and are collected in an inclined underlying tray 40 for discharge from the machine by conduit 42.

The solids of the underflow are −37 um fractions which can be discarded or when desired the residual coal content can be recovered by treatment in froth flotation cells or in a high speed centrifuge. The peptized condition of the underproduct greatly enhances the separation process by froth cells. The coal is more amenable to the action of the frothing agent and the efficiency of coal recovery is improved.

When a high speed solid bowl centrifuge is used, a cut should be made at about 2, um because the clay is predominantly contained in the −2, um fraction. To be economically feasible the plus 2, um of the −37, um fraction must be mainly coal. The burden on the centrifuge is reduced due to the initial separation by the vibrating screens. In FIG. 1 conduit 42 is illustrated schematically in which clay and other contaminants conducted by the conduit are discharged into a silt pond or a waste area generally indicated by reference numeral 44. The screen over product recovered from the vibrating screens is delivered by line 38 to a vibrating hopper 46 or if desired the top screen product may be delivered first to a belt press 48.

When the coal mass is delivered by line 38 from the vibrating screens to the vibrating hopper 46, the coal particles collect in a hopper chamber 50 wherein vibrating tubes 52 are arranged as fingers as shown in FIG. 1, extending along the height of the coal mass and angularly at the bottom portion to exit sites in one of two stopping bottom wall sections. The tubes 52 are perforated and packed with long grained filter media. A motor 54 coupled through an eccentric 56 to vibrator frame imparts low frequency large amplitude vibration to the tube 52. The tubes deliver liquid collected in the hopper chamber to drainage ports 58 which communicate with a drain box 60. The hopper chamber 50 has an opening in the other slopping bottom walls which communicate with a discharge chamber 62 having helical flight attachments 64 on a shaft 66 driven by a motor 68. Coal particles are carried by the flight attachments from the bottom of the hopper chamber to a discharge header box 70 for delivery by line 77. The incoming coal particles in line 38 typically have a moisture content of 30–31% by weight. After about 29 minutes treatment time in the vibrating hopper, the moisture content is reduced to 24% by weight.

Energy can be imparted to the mass of coal in the hopper chamber 50 by other means than mechanically operative vibrator device. Such other means can take the form of perforated tubes extending in the coal mass in a manner similar to tubes 52. The perforated tubes connected with a header by which compressed air can be delivered to the tube and exhausted through the perforated openings to the coal mass. Such streams of compressed air permenating the coal mass transfers sufficient energy to drive moisture from the surface of the coal particles.

When it is desired to speed up the dewatering process, the coal particles in line 38 are first mixed with a small quantity, typically 1% lignosulfonate by weight of coal particles in a ribbon type mixer 74 and then the admixture of coal particles and lignosulfonate are fed to the hopper chamber 50. After about 10 minutes treatment in the vibrating hopper, the moisture content of the coal is reduced to about 24% by weight when discharged from the hopper. No further moisture reduction will occur beyond 10 minutes treatment time with the lignosulfonate in the hopper 46. The lignosulfonate has an affinity for carbon and therefore drives adhered moisture on the coal from the coal particles.

A surprising result resides in the discovery that the removal of the clay renders the resulting coal particles particularly suitable for extruding operations to produce a product which can be more easily handled and shipped. Ultra fine clay containing coal without dewatering including desliming, according to the present invention, cannot be extruded without a moisture reduction to below about 10% by weight and the addition of expensive lubricants and binders. The extruder is identified by reference numeral 76.

The feed stream in line 38 can be fed alternatively to a chamber 78 of the belt press 48 and discharged under gravity onto a first endless belt 80 which carries the coal water burden beyond a roller 82A to a second endless belt 84. The belts 80 and 84 are sieve belts made of synthetic fiber so that liquid, particularly water, can freely pass from the coal particles on and between the belts on a horizontal drainage section 86 and in a roller pressing section 88B. Liquid draining from the belts is collected in a container 90. The coal and liquid mixture between the belts entering section 88A is subject to high pressures and shearing forces as the belts pass along a tortuous path formed by rollers 88B which are connected to a suitable drive. Other rollers 88C and 88D as well as roller 88A are removably mounted to control tensioning of the belts by actuators. The dewatered feed stream is discharged from between the belts at 88E. The coal mass recovered from the belt press is ready for use.

The hydrophobic characteristic of the mass of recovered coal particles from the vibration hopper or belt press even without the addition of lignosulfonate undergoes an accelerated reduction to the moisture content. Upon exposure to the atmosphere, a constant rate drying period is initiated during which the surface of the coal mass is entirely wet. Evaporation takes place at whatever rate is dictated by the surrounding conditions of air temperature, humidity and replacement rate of air and coal particle moisture. An upward change in the temperature of the cake whether induced internally or by external means, results in an expansion of the solubilized air. This results in creation of internal pressure on the entrained moisture in capillaries and interspaces between coal particles. Net effect of this is to accelerate the capillary migration, or wicking of the internal moisture toward the surface of the coal mass and in turn, the reduction of time required for the evaporative process to be totally effective.

The wet screening apparatus is surprisingly effective and produced a dramatic reduction to the water content to the top screen product. Prior to the present invention, it was not possible to reduce the water content of clay contaminated mass of −100 mesh (−150, um) coal particles recovered from an aqueous slurry below about 40% by weight. Moreover, a more surprising result is the dramatic decrease of the ash content of the various fractions of the minus −100 mesh (−150, um) screen over-product when compared with a wet sieve analysis of a peptized head sample of the feed to a Derrick screen equipped to separate at a nominal 400 mesh or 37, um. The results are given in Table I.

TABLE I

| Mesh Size | Weight | | | | Dry Ash | | | |
|---|---|---|---|---|---|---|---|---|
| | Head Sample | | Over-Product | | Head Sample | | Over-Product | |
| | % | Cum. | % | Cum. | % | Cum. | % | Cum |
| 100 × 325 | 32.1 | 32.1 | 66.0 | 66.0 | 15.9 | 15.9 | 8.2 | 8.2 |
| 325 × 400 | 5.1 | 37.2 | 10.6 | 76.6 | 17.2 | 16.1 | 11.6 | 8.7 |
| 400 × 500 | 5.7 | 42.9 | 6.0 | 82.6 | 20.3 | 16.6 | 12.9 | 9.0 |
| −500 | 57.1 | 100.0 | 17.4 | 100.0 | 45.6 | 32.1 | 39.8 | 14.4 |

Wet sieve analyses show the transfer of the higher ash clay and other minus 37, u.m. impurities to the screen under product by way of the passage of the aqueous solution through the screen openings. This can be seen by comparison of the dry ash content of the screen over product fractions with those of the under product fractions. The results are given in Table II.

TABLE II

| Mesh Size | Weight | | | | Dry Ash | | | |
|---|---|---|---|---|---|---|---|---|
| | Head Sample | | Over-Product | | Head Sample | | Over-Product | |
| | % | Cum. | % | Cum. | % | Cum. | % | Cum |
| 100 × 325 | 66.0 | 66.0 | 0.1 | 0.1 | 8.2 | 8.2 | 11.7 | 11.7 |
| 325 × 400 | 10.6 | 76.6 | 0.6 | 0.7 | 11.6 | 8.7 | 13.4 | 13.1 |
| 400 × 500 | 6.0 | 82.6 | 5.7 | 6.4 | 12.9 | 9.0 | 20.7 | 19.8 |
| −500 | 17.4 | 100.0 | 93.6 | 100.0 | 39.8 | 14.4 | 45.8 | 45.4 |

In this test the cumulative recovery of coal values in the plus 25, um fraction of the feed as calculated on an ash balance basis was found to be 99.2%.

Figure 2:
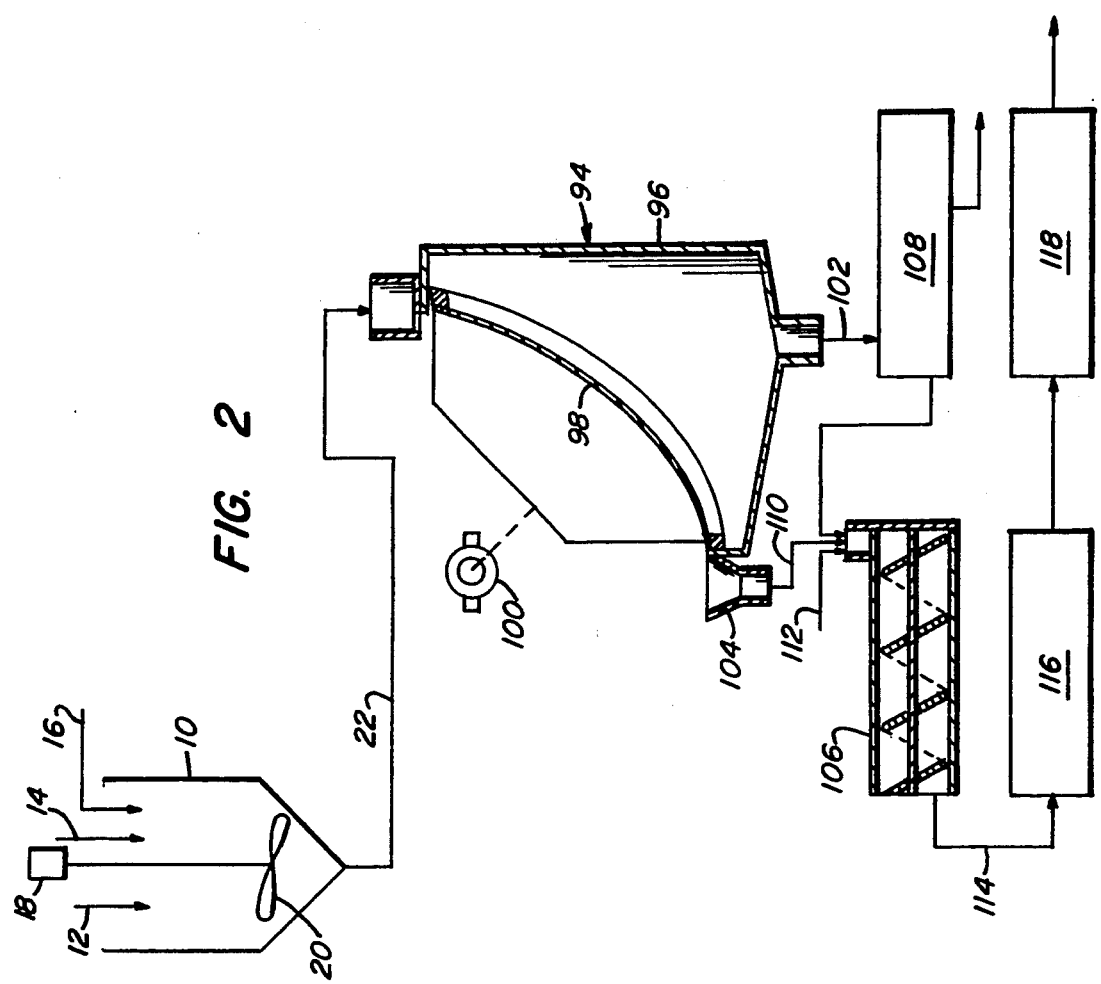
FIG. 2 is a schematic illustration of a second embodiment of the apparatus of the present invention which is also suitable to carry out the method of the present invention.

In FIG. 2 there is illustrated a further embodiment of the present invention, in which vessel 10, like the embodiment of FIG. 1, receives coal feedstock, water and a peptizing agent from supply lines 12, 14 and 16, respectively. The feed stock is mixed under high shear forces by motor 18, and the mixing process is carried out for a sufficient period of time to peptize clay particles which are driven from the surface of the coal particles. The mixture is delivered from the vessel 10 to a head box of a vibrating sieve bend 94 where the aqueous phase including peptized clay and undersized solids drain to a collection pan 96 from the mass of coal particles on curved screen assembly 98. The screen assembly is vibrated by drive motor 100 at a high frequency, e.g., 3600 cycles per minute at a low amplitude motion. The under product including an aqueous phase is carried away by a drain line 102. The over-product from sieve bend 98 is delivered by way of a hopper collector 104 to a pug mill 106. The fraction in drain line 102 is delivered to a vibrating screen assembly 108 which can be the same as screen assembly 24 described hereinbefore and shown in FIG. 1. The screen over-product is delivered by line 110 to the pug mill 106. This arrangement of apparatus has the advantage of offering a greater residence time by the underflow in line 102 on a vibrator screen 108 so that the moisture on the face surfaces of the coal particles can be acted upon for a longer period of time as the coal particles pass along the vibrating screens. The product fed to the pug mill 106 is mixed with lignosulfonate, a binder or other agent delivered by line 112 to the pug mill and mixed therein with the coal particles. The product discharged from the pug mill is delivered by line 114 to vibrating hopper 116. After dewatering in hopper 116, the coal particles form into suitable extruded shapes by extruder 118 for shipment. Instead of extruder 118, if desired, the product from the vibrating hopper can be fed to a rotating pelletizing drum, disc or pin mixer where the coal particles are agglomerated into pellets.

Figure 3:
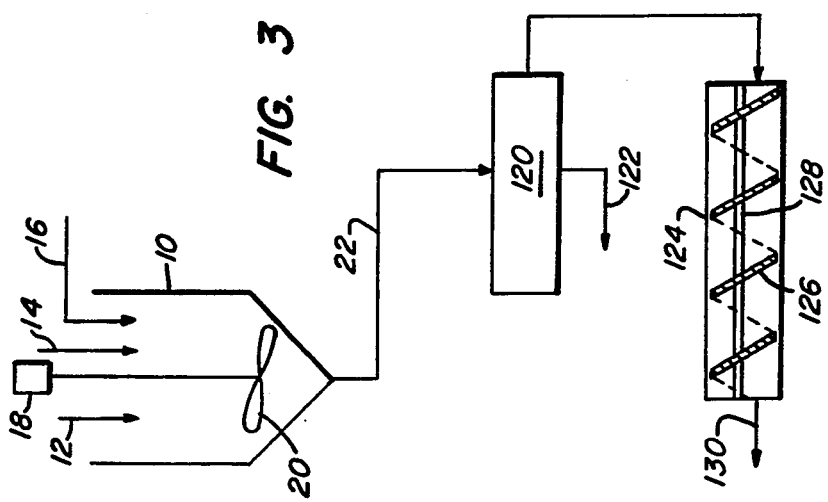
FIG. 3 is a schematic illustration of the third embodiment of the present invention.

In FIG. 3, like the embodiments of FIGS. 1 and 2, vessel 10 receives coal feedstock, water, and a peptizing agent from supply lines 12, 14 and 16, respectively. Mixing occurs under high shear force conditions produced by blade 20 driven by motor 18. The coal slurry is delivered by line 22 to a vibrating screen assembly 120 which is the same as screen assembly 24. The screen under products can be discarded by line 122 and the screen over-product is delivered to a pug mill 124 which includes a helical mixing blade 126. Lignosulfonate is mixed with the coal particles in the pug mill to speed up the dewatering process. Aqueous liquid drains from the coal slurry in the pug mill by line 130. The coal particles can then be treated according to embodiments of FIGS. 1 and 2 downstream of assembly 24.

Figure 4:
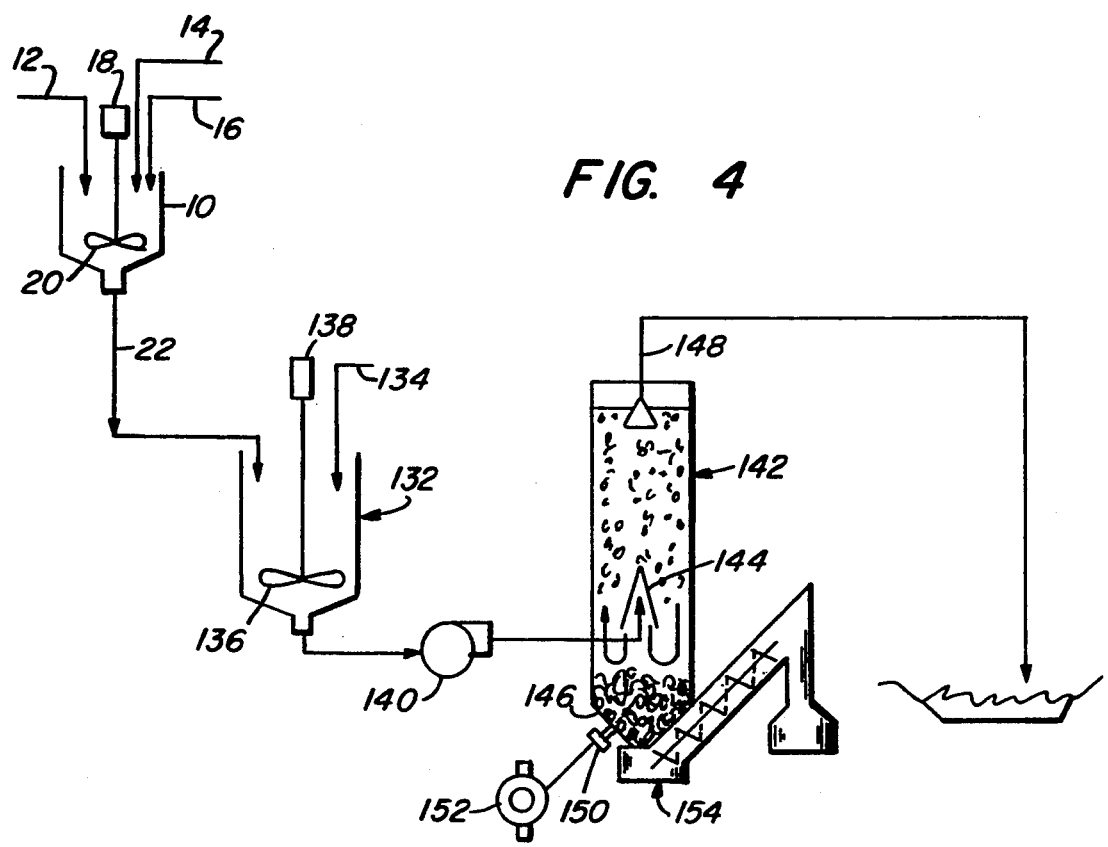
FIG. 4 is a schematic illustration of a third embodiment of the apparatus of the present invention which is also suitable to carry out the method thereof.
Figure 5:
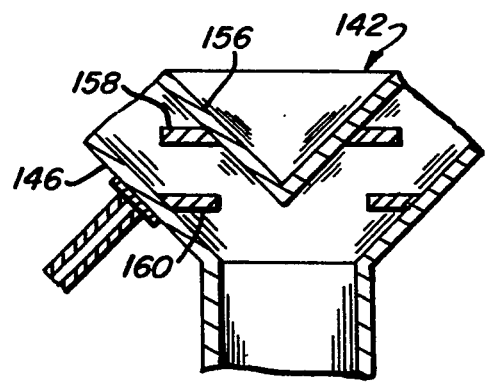
FIG. 5 is an enlarged view in section of the coal withdraw portion of a classifier included in the apparatus of FIG. 4.

In the embodiment of the invention shown in FIGS. 4 and 5, like the embodiments of FIGS. 1, 2 and 3, a vessel 10 receives coal feedstock, water and peptizing agent in lines 12, 14 and 16 respectively. The feedstock, initial pulping water and peptizing agent are introduced into the peptizing tank to produce a slurry having from 10% to 45% dry solids. The slurry is mixed for a period of time, under conditions imparting high shear forces to the coal particles. Usually a mixing time of at least 50 minutes is required. Should the peptizing agent be pH sensitive, then a pH adjustment is made to the aqueous coal slurry by the addition of a suitable neutralizing agent before the addition of the peptizing agent. This is particularly true when sodium hexametophosphate is used. Other peptizing agents which are not pH dependent are well known and can be selected for use. As explained previously, the mixing of the slurry in the peptizing vessel, peptizes the clay particles and deagglomeration occurs which renders the individual coal impurities other than clay and clay particles into a state of discreteness. The individual clay particles fall within a typical size range of between 0.68 and 2.0 micrometers and interact with a peptizing agent to effect an ionic exchange thereby imparting to the clay particles a strong negative electrokinetic charge. The peptized clay particles become discrete and become suspended as a colloid in the associated water of the slurry.

The peptize slurry after mixing, is transferred by line 22 to a dilution tank 132 wherein the percent of dry solids making up the coal water slurry is adjusted by lowering the percent to permit unhindered settling of unpeptized particles larger than the point of classification size as well as unhindered upward migration of water, clay and such other particles of coal and associated unpeptized material that are smaller in particle size than the chosen point of classification. Typically, it is desired to adjust the solid content of the slurry with the addition of water from supply line 134 whereby the dry solid content is a maximum of 10 percent but not less than 2.5 percent. Solids are kept in solution in dilution tank by means of stirring blades 136 driven by motor 138. The slurry from the dilution tank is then delivery by a flow line connected to a metering pump 140 into an up-current classifier 142. The point of entry in the classifier by the diluted coal water slurry is at the site of dispersion dispenser 144. The dispenser is a generally conical member having the apex thereof directed upward whereby a slurry entering the classifier proceeds against the inter conical wall of the disperser so that the slurry rebounds and is directed toward the truncated conical bottom 146 of the up-current classifier. The dispenser can take the form of a rotating perforated arm driven by the velocity of the aqueous slurry exiting from the perforations.

The slurry introduction procedure provides guidance for the particles of coal to settle in the manner of a sediment. Water with peptized clay as a colloid therein along with small coal particles and other minerals of lesser size migrate to a point of classification along a reverse coarse of travel and pass upwardly towards the discharge opening 148 at the top of the classifier. The classifier is constructed so as to siphon off the effluent in a quiescent and controlled manner. Since the settled coal particles and non-clay mineral particles are rendered dilatant and hydrophobic in the peptization process as opposed to a non-dilatant, hydrophilic properties of clay, coal and other associated minerals. The settled particles in the truncated conical bottom 146, of the classifier arrange themselves in a manner conductive to the exclusion of the presence of water and its accompanying peptized clay load imposed by the overlying column of liquid. Low frequency, high amplitude vibrations, generated by a vibrator 150 driven by motor 142 are imposed on the conical bottom 146 which serves as an inducement to the resistance of the introduction of water into the settled material at the conical bottom. To eliminate the possibility of rat holing, it may be necessary in some instances to install an inverted cone in the interior of the conical bottom so as to create an annular opening between the cone and conical bottom 146 of a proper width through which settled particles can pass in their downward movement towards discharge conveyor screw assembly 154 which draws off quantities of coal particles from the classifier.

As best shown in FIG. 5, an upset cone 156 is fit into the interior of the conical bottom of the separator n a spaced relation from the conical bottom 146 to form angular opening between the two cones. The width of the opening is selected so that cone particles can pass in their downward movement towards a discharge assembly 154. As the settled particles become compacted in the annular gap, free water migrates to the interface between the compacted mass and the surface of the conical bottom. Further, dewatering is achieved by a series of horizontally arranged annular rings 158 and 160 which are installed as shown in FIG. 5 on the cone 156 and annular bottom 146, respectively, to interrupt the continuity of the flow path. The rings may be packed with non-corroding metal wool so as to provide an unobstructed fee passage for captured water to exit at the ring through a portal opening in the side wall of the classifier. Each ring will produce a constant discharge of water from the classifier.

Point size of classification is a function of the vertical distance between the point of dispersion/distribution and the velocity of the upward moving column of water and its load of colloidal clay and ultra fine particles. In turn, velocity is a function of the area dimensions of the vessel, percent of dry solids in the slurry and volumetric rate of introduction of slurry into the up-current classifying vessel. Since the characteristic of each raw feedstock and the market requirements for the end product to be recovered from it are site specific and the largest size clay platelet is smaller than 2, um, a classification point of 2, um for most coals should prove desirable. However, higher points of classification, such as 10 um and even as large as 25, um, may be found more suitable to effect the desired degree of ash reduction to be attained in the process.

Ash reduction is limited to the total of the ash of the clay minerals that can be peptized. In the majority of coals this should be sufficient to reduce the ash in the finished product to a point acceptable to the market place. Since pyrite occurs as circular platelets in all sizes in ultrafine raw coal, all free pyrite in the peptized slurry of a finer size than the point of classification will report to the tailings of the sulfur content of the recovered product will be commensurately reduced.

The effect of rendering the recovered particles dilatant and hydrophobic along with compaction through vibration allows removal of the product from the classifier at an initial moisture level of about 27 percent as compared to a moisture content of about 34 percent should the product be repulped and then dewatered in a high speed centrifuge. Recovery by centrifuging of an unpeptized −100 mesh (−150, um) feedstock produces a cake having a minimum of 40 percent moisture and more likely in the range of 50 percent to 60 percent moisture. By way of comparison, the moisture content of the underflow from an up-current classifier feed of an ultrafine unpeptized raw coal slurry will rarely be less than 65 percent.

Within the initial hour after discharge from the vessel natural drainage will eliminate all of the free water. During this period and continuing thereafter until all of the unbound water has been eliminated, the evaporation phenomenon is in effect. For example, without thermal assist the moisture content of a layer of product ¼" to ¾" thick will be reduced at the rate of 1.2 percent per hour until air dry equilibrium is reached.

If the product is mixed with a small amount of lignosulfonate and then exposed to the ambient atmosphere in a layer of similar thickness in static air, the natural evaporation phenomenon results in a reduction of the remaining unbound moisture at the rate of 3.6 percent per hour.

It is necessary to understand that ultrafine coal that has been stripped of all clay through the peptization process has entirely different physical characteristics than those of a normal coal/clay association. In addition to the dewatering phenomenon, this change in characteristics permits the reforming of ultrafine coal into larger, more marketable forms by extrusion, pelletizing or pressing. Generally, this is not presently economically possible with unpeptized ultrafine coal.

Figure 6:
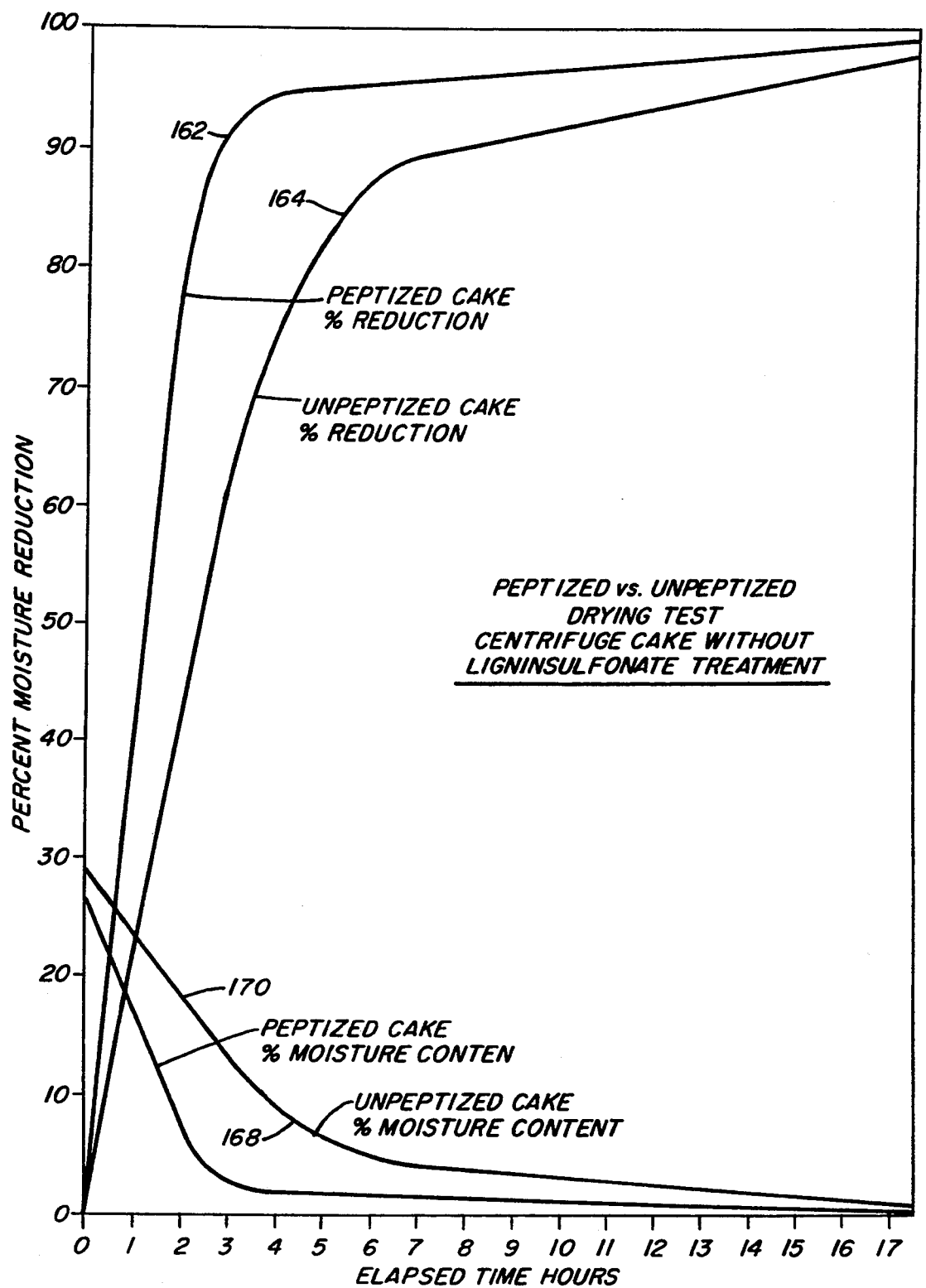
FIGS. 6, 7 and 8 are graphs illustrating the moisture reduction effect on dilatant and hydrophobic coal particles according to the present invention.

In the graph of FIG. 6, a drying test is demonstrated by a comparison between peptized and unpeptized centrifuge cakes about ¾" in thickness without the addition of lignosulfonate in a 115 degrees F. forced air atmosphere. As can be seen from FIG. 6, graph line 162 indicates the percent reduction of moisture in a processed cake comprised of dilatant coal particles and graph line 164 shows a reduction to moisture contact of a raw cake comprised of coal particles that are not dilatant. A dramatically increased amount of moisture is drawn from the dilatant coal particles as can be seen from a comparison of graph lines 168 and 170. The percent of moisture content in the processed cake was found to decrease as shown by graph line 168 to about 2 percent within about 3½ hours after processing according to the present invention. An unprocessed filter cake did not obtain a corresponding percent moisture content until about 14 hours after treatment as shown by graph line 170.

Figure 7:
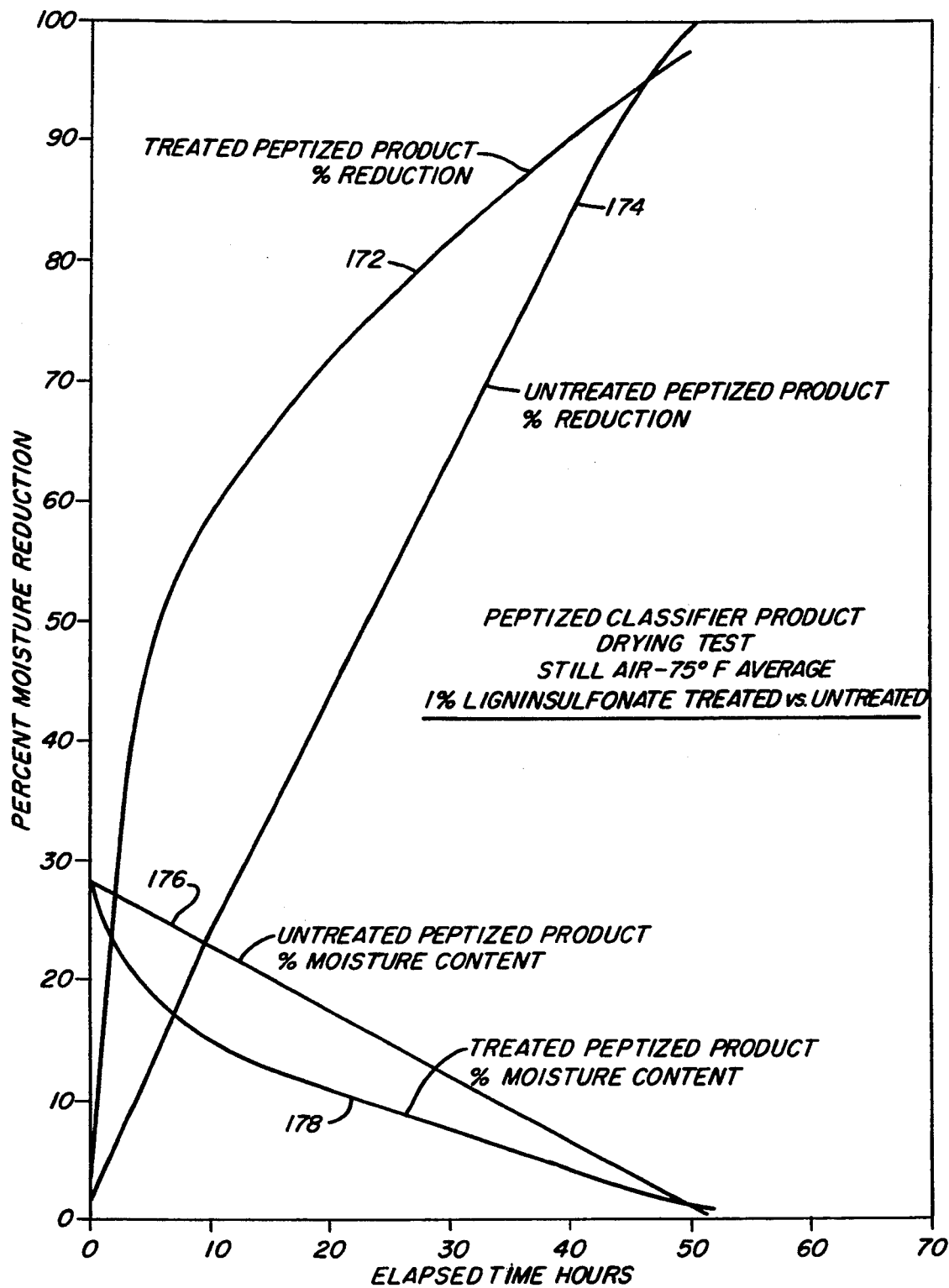

FIG. 7 illustrates, by two sets of graph curves, the percent reduction to the moisture content of a peptized classifier coal product in a drying test wherein the ambient temperature was 75 degrees F. average in static atmospheric air. Graph line 172 shows the dramatic reduction to the percent of the moisture content in the classifier product which is mixed with one percent by weight lignosulfonate as compared with graph line 174 which shows the percent reduction to the moisture content in the same classifier product but without the addition of lignosulfonate. There was about a 47% moisture reduction to the treated peptized product within the first five hours as compared with only about a 13% reduction during the same time period of an untreated peptized product. Similarly, the percent of moisture in the classifier product treated with lignosulfonate dropped rapidly as can be seen by graph line 176 as compared with graph line 178 which shows the percent of moisture content of the classifier product without the addition of lignosulfonate.

Figure 8:
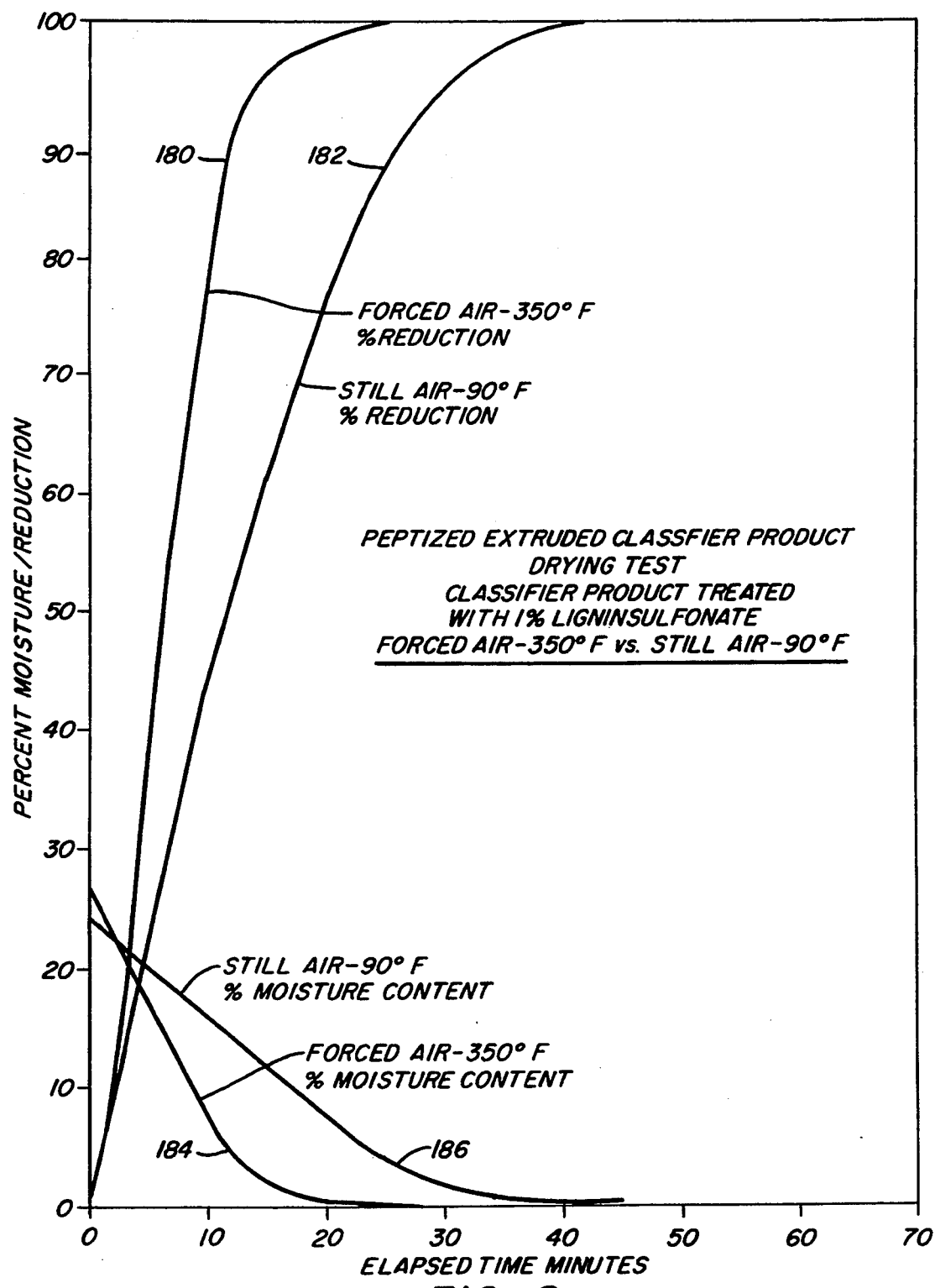

In FIG. 8, the effect of heated forced air at 360 degrees F. verses 90 degrees F. ambient still air on the moisture reduction of a peptized extruded classifier product is shown by pairs of graph lines. In the drying test depicted by the graph lines of FIG. 8, classifier product samples are treated with one percent lignosulfonate. One sample was exposed to forced air at 350 degrees F., while another sample was exposed to still air at 90 degrees F. ambient. The percent reduction of moisture content in the forced air classifier product is shown by graph line 180, and it can be seen that within the first 10 minutes, a very draumatic moisture reduction occurs as compared with the moisture reduction of the classifier product in static air as shown by graph line 182. The effect on the moisture content of the classifier product under forced air condition shows that within about 15 minutes as depicted by graph line 184 there was a percent moisture reduction that could not be achieved in still air until about a lapsed time of 30 or more minutes as depicted by graph line 186. Thus, as can be clearly understood by those skilled in the art, the effect of lignosulfonate greatly enhances the speed at which dewatering of the mass of coal particles occurs.

Figure 9:
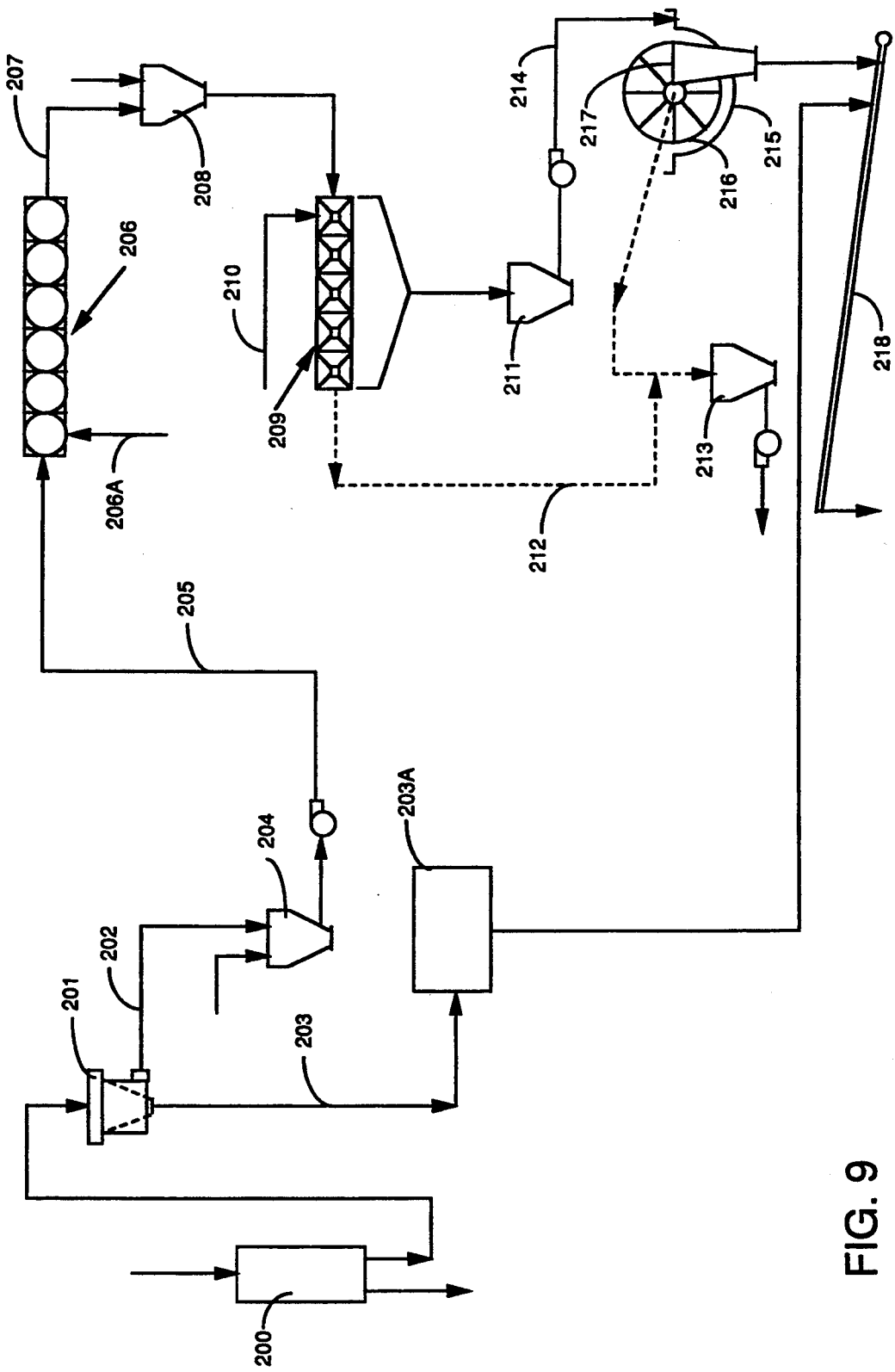
FIG. 9 is a schematic illustration of a preferred arrangement of apparatus of the present invention which is also suitable to carry out of the method thereof.

In FIG. 9 there is illustrated a preferred embodiment for carrying out the method of the present invention. A raw silt-pond feedstock undergoes initial processing in a raw feedstock supply 200 which includes as an initial preparation of the feedstock, screening the feedstock to obtain a minus 4" fraction which undergoes deagglomeration, processing and classifying to derive a minus ¼" size fraction. The minus ¼" fraction is treated in a holding vessel with a pH reagent and mixed with quantities of water to form an aqueous slurry of minus ¼ particles of coal contaminated with clay adhered to the coal particle surfaces. The process of the present invention is addressed to treating ultra-fine coal particles and therefore the slurry is delivered to a classifying device preferably in the form of a sieve 201 which supplies in line 202 a minus 50 micron fraction and in line 203 an oversized product of ¼ × 50 micron. The oversized product in line 203 can be beneficiated by apparatus 203A comprising well known apparatus and then the product recombined with the minus 50 micron fraction after undergoing treatment according to the present invention. The undersized product in line 202 is treated in a vessel 204 with a pH reagent thereby the pH of the slurry is adjusted to a predetermined value of between 6 and 9, preferably at or about 7.0. The pH adjusted slurry is fed by line 205 to one or a series of peptization cells 206. As in the other embodiments of the present invention, the slurry is treated in the peptization cells with the addition of a peptizing agent supplied by line 206A in the presence of an impeller that imparts sufficient energy to the slurry to strip clay from the coal surfaces and reduce the size of the clay to platelets in the presence of the peptized agent. The clay platelet in the presence of the peptizing agent is peptized instantly to impart an electrokinetic charge to the clay platelets rendering it repulsive to other clay platelets as well as incapable of electrokinetic re-adherence to the surface of the coal particles. The peptized clay platelets have a particle size of less than 2 microns.

The slurry containing the peptized clay platelets and coal particles with clean face surfaces is collected from the peptizing tank(s) for feeding by line 207 in a vessel 208. The slurry in line 207 is made up of 30% solids and in vessel 208 there is added to the slurry additional quantities of water to reduce the slurry to about 5% by weight solids. The slurry is then supplied from the vessel to an array of froth floatation cells 209 wherein the slurry is combined with reagents supplied in line 210. The froth fraction carries the coal particles to a froth sump 211 while an underflow from the froth cells is delivered from line 212 to a tailings sump 213 which in turn delivers the tailings for disposal. The tailings are comprised mainly of a peptized clay and aqueous medium of the slurry. The fraction delivered from the tailings sump 213 is generally a minus 5 micron fraction and may be specifically chosen to comprise a minus 2 micron fraction. The clay platelets which are peptized in the process of the present invention attain a state of discreetness in the slurry with a size that falls within a minus 2 micron fraction.

Turning now to the froth sump 211, the fraction is delivered to line 214 to a dewatering device which in the preferred form shown in FIG. 9 comprises a vacuum filter 215. In its preferred form, the vacuum filter is a disk type filter. Such a filter includes a multiplicity of side-by-side disks carried by a hollow rotatable arbor. Each filter disk is made up of arcuate segments that can operate independently of one another. Each disk rotates to submerge a lower part of the disk in a froth containing the slurry supplied by line 214. A vacuum is applied to the disk to form an initial layer of ultra fine coal particles. The initial layer of clay ladened coal particles on the submerged portion of the disk in the absence of the present invention would normally severely impede the separation of water from the solids of the slurry. However, according to the present invention since the coal particles are free of adhered clay the collection of coal particles on the disk forms a dilatant coal layer which facilitates the extraction of aqueous medium as well as peptized clay platelets through the dilatant coal layer. As this occurs additional quantities of coal particles are collected in a superimposed relation on the initial dilatant coal layer so that there is formed a dilatant coal mass which continues to offer great permeability for a discharge flow of aqueous medium as well as peptized clay. The dilatant property of the coal mass continues while the mass is carried by the disk filter from froth containing a slurry to an open atmosphere which then provides that the dilatant property serve to continue the extraction of aqueous medium along with peptized clay for dewatering the mass. The filter cake now adhered to the filter disk is carried by the rotation of the disk to a designated discharged site which is identified in FIG. 9 by reference numeral 216. At the discharged site, the individual segment of the disk is supplied with relative low pressure air to discharge the filter cake from the surface of the screen. The release process of the filter cake is also enhanced by the operation of a scraper blade identified by reference numeral 217. The dewatered filter cake which is recovered by the vacuum filter is discharged on to a conveyer belt 218. It has been found that the moisture content of the coal product recovered on conveyer 218 will initially have a moisture content of between 18% and 20% depending upon the particle size distribution. However, when 70% of the coal particles are minus 37 microns, the moisture content may be as high as 28%.

Experiments with dilatant properties of the coal mass have been carried out in which a mass of coal collected in a pile about 6 foot high was allowed to be exposed to the outside environment for an extended period of time. About 6 inches in depth into the coal mass, a 6% moisture content was found whereas at a depth of about 3 feet, the moisture content was about 8% and at about a depth of approximately ground level, the moisture content was about 18%. The initial moisture content was 18%. Thus it has been found that the dilatant property of the coal mass expels moisture from ultra fine coal particles to a large extent only by capillary action. This has been found to exists because the clay adhered to the surface of the coal particles vigorously retains inherent moisture in the clay itself. This inherent moisture is not easily given up without the application of economically unacceptable amounts of external energy, such as heat energy.

In regard to the embodiment of FIG. 9, in the event it is desired to obtain a clean coal product with greatly reduced water content of the resulting coal mass according to the present invention wherein the coal product is made up of coal particles having a much greater size than 50 microns, such may be accomplished by feeding the aqueous slurry of the raw feed supply 200 directly to the peptizing cells 201. After peptizing, the slurry can be treated in a sieve for size separation to obtain a large coal fraction and an ultra-fine coal fraction. The large coal fraction typically made up of a greater than 50 micron fraction and a minus 50 micron fraction. The greater than 50 micron fraction can be dewatered using a vibrating screen and the minus 50 micron fraction can be dewatered as described supra by feeding the fraction by feeding the froth flotation cells 206. Thereafter the product from the froth flotation cells can be processed in the same manner as already described in the embodiment of FIG. 9.

It has been found that the ultra-fine coal product derived from the method and apparatus of the present invention has a remarkably increased BTU value as compared with an untreated product. Using a bomb calcimeter test, it has been found that a minus 50 micron coal fraction after treatment according to the treatment of the process of FIG. 9, exhibits abetween 100 and 150 greater BTU value on a moisture ash free basis than a like minus 50 fraction without processing according to the present invention.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:
1. Apparatus for dewatering an aqueous coal slurry, said apparatus including a vessel for an aqueous slurry containing an aqueous medium and clay contaminated coal particles; said apparatus further comprising,
    a source of peptizing agent;
    means for supplying said peptizing agent to said vessel;
    means for imparting high shear forces to the aqueous slurry containing said peptizing agent in said vessel for imparting dilatency to the coal particles by separating clay contaminates from the coal surface without flocculating the coal particles and for subdividing the clay to clay platelets, said high shear force being applied without the presence of any flocculating agents i said vessel for said coal particles, to peptize the clay platelets;
    sieve means including an aqueous permeable barrier capable of forming thereon a barrier layer of aqueous permeable unflocculated dilatant coal;
    means for transferring the peptized clay and coal from said vessel to said sieve means;
    means for applying a force in the presence of said barrier layer of aqueous permeable unflocculated dilatant coal for dewatering the coal mass by draining aqueous medium along with discrete peptized clay platelets from the coal particles contained in said slurry;
    said means for transferring and said sieve means steps being performed in the absence of any flocculating agents for said coal particles; and
    means for recovering the dewatered coal particles.

2. The apparatus according to claim 1 wherein said sieve means comprises a vacuum filter.

3. The apparatus according to claim 1 wherein said sieve means comprises a disc type filter.

4. The apparatus according to claim 1 further including froth flotation cells for extracting quantities of peptized clay to a tailings sump.

5. The apparatus according to claim 1 further including froth flotation cells to extract a minus 5 micron fraction to a tailings sump.

6. The apparatus according to claim 1 further including froth flotation cells to extract a minus 2 micron fraction to a tailings sump.

7. The apparatus according to claim 1 wherein said means for imparting high shear forces further includes a rotary impeller.

8. The apparatus according to claim 1 further including means operable with said sieve means for recovering said dewatered coal particles.

* * * * *